(12) United States Patent
Zaydman et al.

(10) Patent No.: US 11,144,412 B2
(45) Date of Patent: Oct. 12, 2021

(54) VIRTUAL MACHINE IMAGE FILE SYNCHRONIZATION USING DELTA BITMAPS AND DELTA FILES

(71) Applicant: VMware, Inc., Palo Alto, CA (US)

(72) Inventors: Oleg Zaydman, San Jose, CA (US); Preeti Kota, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 140 days.

(21) Appl. No.: 15/613,970

(22) Filed: Jun. 5, 2017

(65) Prior Publication Data

US 2018/0349233 A1    Dec. 6, 2018

(51) Int. Cl.
| G06F 11/16 | (2006.01) |
| G06F 11/20 | (2006.01) |
| H04L 29/08 | (2006.01) |
| G06F 16/178 | (2019.01) |

(52) U.S. Cl.
CPC ...... *G06F 11/1662* (2013.01); *G06F 11/1658* (2013.01); *G06F 11/2035* (2013.01); *G06F 11/2048* (2013.01); *G06F 11/2082* (2013.01); *G06F 11/2097* (2013.01); *G06F 16/178* (2019.01); *H04L 67/06* (2013.01); *H04L 67/1095* (2013.01); *G06F 11/16* (2013.01); *G06F 11/2071* (2013.01); *G06F 11/2089* (2013.01); *G06F 2201/815* (2013.01)

(58) Field of Classification Search
None
See application file for complete search history.

(56) References Cited

U.S. PATENT DOCUMENTS

| 6,735,766 B1 * | 5/2004 | Chamberlain ............ G06F 8/65 709/203 |
| 8,020,041 B2 | 9/2011 | Huang et al. |
| 8,650,564 B2 | 2/2014 | Huang et al. |
| 9,652,485 B1 * | 5/2017 | Bhargava ............... G06F 16/219 |
| 2007/0300221 A1 | 12/2007 | Hartz et al. |
| 2009/0216975 A1 | 8/2009 | Halperin et al. |
| 2013/0007733 A1 * | 1/2013 | Fries .................... G06F 9/45558 718/1 |
| 2014/0181015 A1 | 6/2014 | Bonzini |
| 2015/0178105 A1 * | 6/2015 | Graham ............... G06F 9/45558 718/1 |
| 2015/0378771 A1 * | 12/2015 | Tarasuk-Levin .... G06F 9/45558 718/1 |
| 2016/0170841 A1 * | 6/2016 | Yarnell ................. G06F 11/1076 714/19 |
| 2017/0177689 A1 * | 6/2017 | Bonnell ............. G06F 17/30575 |

* cited by examiner

*Primary Examiner* — Meng Ai T An
*Assistant Examiner* — Zujia Xu

(57) ABSTRACT

A synchronization process for virtual-machine images (and other segmented files) provides for generating a "delta" bitmap indicating which segments (e.g., clusters) of a first virtual-machine image were changed to obtain a second (e.g., updated) virtual-machine image on a source node. The delta bitmap can be applied to the second-virtual-machine image to generate a delta file. The delta file can be sent along with the delta bitmap to a target node that already has a copy of the first virtual-machine image. The transferred delta bitmap and delta file can then be used on the target node to generate a replica of the second virtual-machine image, thereby effecting synchronization. In variations, different bitmaps and delta files can be transferred to optimize the synchronization process.

3 Claims, 4 Drawing Sheets

VIRTUAL MACHINE IMAGE FILE SYNCHRONIZATION USING DELTA BITMAPS AND DELTA FILES

BACKGROUND

The present invention relates to synchronization of virtual-machine images and other files across computing nodes of a network. Herein, "machine" refers to the hardware of a computer. A typical machine is managed by an operating system, which typically hosts a computer application. A "virtual machine" is not a machine, but is software that appears as if it were a machine to a "guest" operating system that it hosts.

In the case of a (physical) machine, the software that defines the functionality for the machine can be stored on non-transitory mass storage media, e.g., a hard disk. A hard disk is typically formatted into sectors, e.g., 512-byte sectors. To reduce management overhead, file systems manage hard disks in groups of contiguous sectors; the groups are referred to as "allocation units" or, more commonly, as "clusters". The operating system also typically aligns files with cluster boundaries, e.g., most files begin at a respective cluster boundary. The data physically encoded on the hard disk forms, in effect, a two-dimensional arrangement of representations of bits. This two-dimensional representation is often referred to as a disk image. The functionality of a computer can be transferred to another computer with identical or similar hardware by transferring the disk image.

As with a physical machine, the functionality of a virtual machine can be physically encoded onto a hard disk, in this case, to form a virtual-machine image. However, the virtual machine image can include the virtual-machine along with a guest operating system and application software. This means that the functionality of a virtual machine can be transferred between machines with dissimilar hardware, as long as the machines are running compatible hypervisors (i.e., virtualizing operating systems).

The fact that virtual machines can be packaged as virtual-machine images has many advantages. For example, if a virtual machine is running up against hardware limitations of its physical machine host, its image can be cloned and the clone can be transferred to other hardware so that two instances of the virtual machine can be operated in parallel to increase throughput. Of course, this "scaling out" can be expanded to larger numbers of parallel instances of a virtual machine.

In many scenarios, it may be desirable to synchronize virtual-machine images. For example, if improvements are made to one instance of a virtual machine, it may be desirable to allow other instances to adopt the same improvements. However, it is not always feasible to apply the same update procedure to every instance of a virtual machine. On the other hand, the bandwidth demands involved in cloning the updated instances and transferring the clones can be excessive. A less demanding approach to synchronization involves generating delta files representing the changes from one virtual machine image to an updated version. The delta files, which are typically much smaller than the full updated virtual machine images, are then transferred and applied to other instances of the original virtual-machine image to propagate the updates.

Although smaller than the updated virtual-machine images, the delta files can still be quite large. The large size of a delta file impacts bandwidth as it is transferred. Also, it can consume considerable disk capacity when stored to provide for future synchronizations. Alternatively, the delta file can be deleted and then regenerated on demand, but this typically requires retention of the pre-updated virtual-machine image, which typically consumes even more storage space than a delta file. So what is needed is an approach to synchronizing virtual-machine images with reduced bandwidth demands and reduced storage demands.

DETAILED DESCRIPTION

The present invention addresses file synchronization by using "delta" bitmaps that represent the differences between virtual-machine images or other segmented files, e.g., an "old" version of a virtual-machine image (VMI) and a "new" or updated version of the VMI, on a segment-by-segment (e.g., cluster-by-cluster) basis. A file-synchronization bitmap can be used: 1) on a source node, to determine what segments of a new VMI are to be included in a delta file; and 2) on a target node to determine how to generate a replica of the new VMI using an instance of the old VMI and the delta file. In many scenarios, delta bitmaps can be logically ORed or otherwise logically combined in a way that reduces the bandwidth and storage requirements for synchronization.

Figure 1:
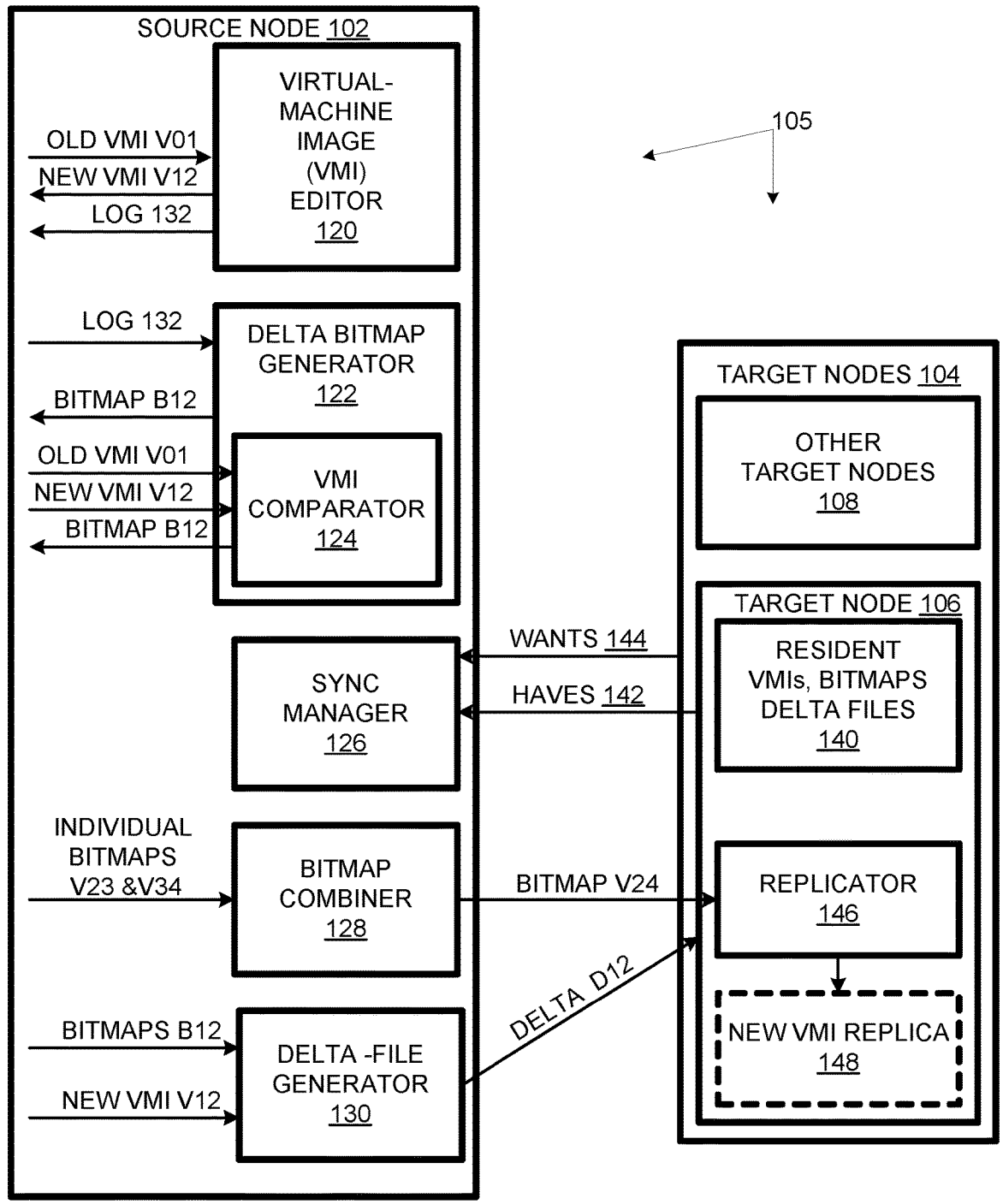
FIG. 1 is a schematic illustration of a computer network across which virtual-machine images are to be synchronized.

As shown in FIG. 1, a computer network 100 includes a source node 102 and target nodes 104, including a target node 106, and other target nodes 108. In some scenarios, the source node can be considered a developer node, while the target nodes can be testing and integration nodes. In other scenarios, the source node can be a publisher node, while the target nodes are subscriber nodes. In some embodiments, virtual-machine distribution is centralized at the source node. In other embodiments, any node of a network can synchronize to any other on a file-by-file basis; in such an embodiment, an update can occur on any network node and a corresponding delta file and delta bitmap can be distributed by that node.

Figure 2:
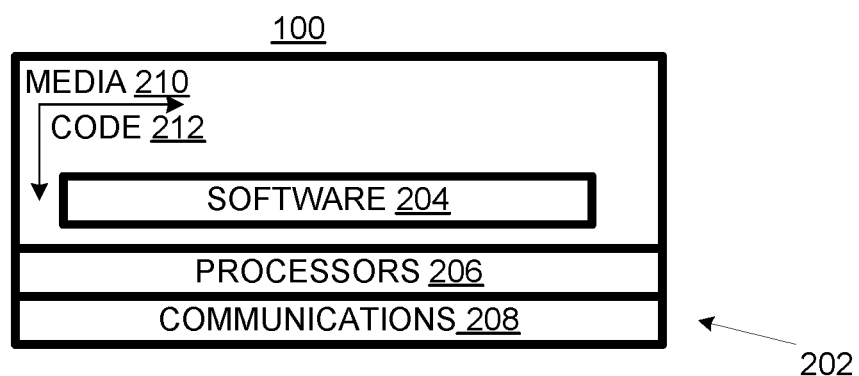
FIG. 2 presents an alternative view of the computer network of FIG. 1.
Figure 3:
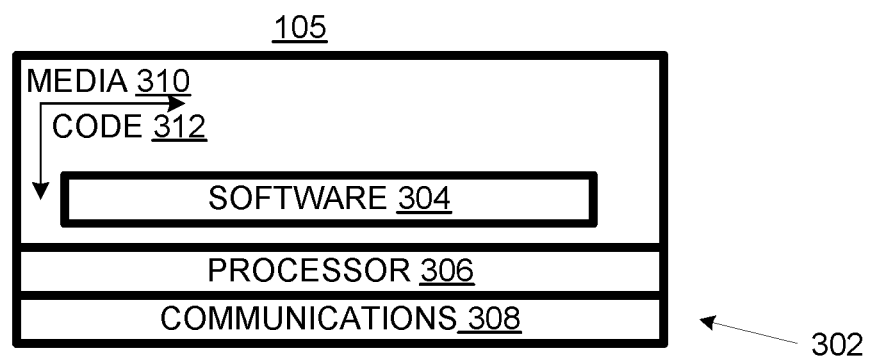
FIG. 3 presents a generalized view of a node of the computer network of FIG. 1.

As shown in FIG. 2, computer network 100 includes hardware 202 and software 204. Hardware 202 includes processors 206, communications devices 208, and non-transitory media 210. Media 210 is encoded with code 212 that represents software 204 and that, when executed by processors 206, implements the functionality defined by software 204. Likewise, as indicated in FIG. 3, each node 105 of network 100 includes hardware 302 and software 304. Hardware 302 includes processor 306, communications devices 308, and non-transitory media 310. Media 310 is encoded with code 312 that represents software 304 and that, when executed by processor 306, implements the functionality defined by software 304. In summary, the functionalities of network 100 and its nodes are provided by a combination of hardware and software as shown in FIGS. 2 and 3.

As shown in FIG. 1, the functionality of source node 102 includes a virtual-machine image editor 120, a delta bitmap generator 122 with a VMI comparator 124, a synchronization manager 126, a bitmap combiner 128, and a delta-file generator 130. Editor 120 is used for creating and modifying virtual machines. In some embodiments, the source node lacks a virtual-machine editor, but serves as a repository for virtual machine images created and/or modified elsewhere. Editor 120 can be used to modify a virtual-machine image version, e.g., virtual-machine image V01, to yield an updated virtual-machine image, e.g., virtual machine image V12. In the process, editor 120 creates and updates a log 132 of modifications to a virtual machine sufficient to determine what segments of a virtual-machine image have been modified. Alternatively, the log can be obtained from another node, e.g., one on which the modifications were originally made. In another embodiment, a log file is not used.

VMI comparator 124 compares files, e.g., virtual-machine images, on a segment-by-segment, e.g., cluster-by-cluster, basis. Comparator 124 outputs a "1" for each mismatch between segments and a "0" for each match. The "1s" and "0s" are arranged in an order corresponding to that of the respective segments in the VMIs being compared. Thus, the "1s" mark segments of the file resulting from the modification that need to be included in a delta file. In an alternative embodiment, the meanings of the 1s and 0s are switched. Comparator 104 allows delta bitmap generator 122 to generate bitmaps, e.g. bitmap B12 for old VMI V01 and new VMI V12, for pairs of VMIs that are related arbitrarily or whose relationship is unknown. Alternatively, bitmap generator 122 can generate a delta bitmap based on a log 132 of modifications, e.g., of old VMI V01 that led to new VMI V12.

Bitmap combiner 128 logically ORs or otherwise logically combines bitmaps to achieve certain transfer efficiencies. For example, if a source node is on a third version of a virtual-machine image and the target node is on a first version, there is no need to first transfer a delta between the first version and a second version and then follow it with a delta between the second version and the third version. A single delta can be generated based on a combined bitmap resulting from logically ORing delta bitmaps for the two modifications. The third version can be reconstructed on the target node based on the first version, the combined bitmap, and the delta file generated by applying the combined bitmap to the third version of the virtual-machine image. Delta-file generator 130 generates a delta file by assembling unmatched, as indicated by the relevant delta bitmap, segments of the post-modification virtual-machine image.

Synchronization manager 126 determines what virtual-machine image on the source node is to be synchronized (what VMI is "wanted") and what virtual-machine images and delta files the target node has that might be useful for the synchronization. Typically, the pre-modification version of a virtual-machine image on the target node is the useful file. However, there are other files that may prove useful in particular cases, especially if the pre-modification version of the virtual-machine image is not present on the target node. Based on its determinations, the synchronization manager determines what bitmap or bitmaps and what delta file is to be sent to the target node.

Target node 106 can include pre-existing resident VMI(s) or other segmented files, delta and combination bitmaps, and delta files 140. More specifically, the target node can include a resident VMI (or other segmented file). The resident VMI can be the same as the old VMI or it can be a different VMI for which a delta bitmap indicating differences between it and the old VMI is available or can be determined. The contents of the target node are communicated to the source node as "haves" 142, whereas the requested VMI(s) is communicated as "wants" 144. Sync manager 126 determines what delta bitmaps and files can optimize bandwidth requirements for meeting a request based on the target contents (haves) and the requested VMI (wants). A replicator 146 constructs replicas 148 of requested files based on the relevant resident files 140 and the transferred files.

Figure 4:
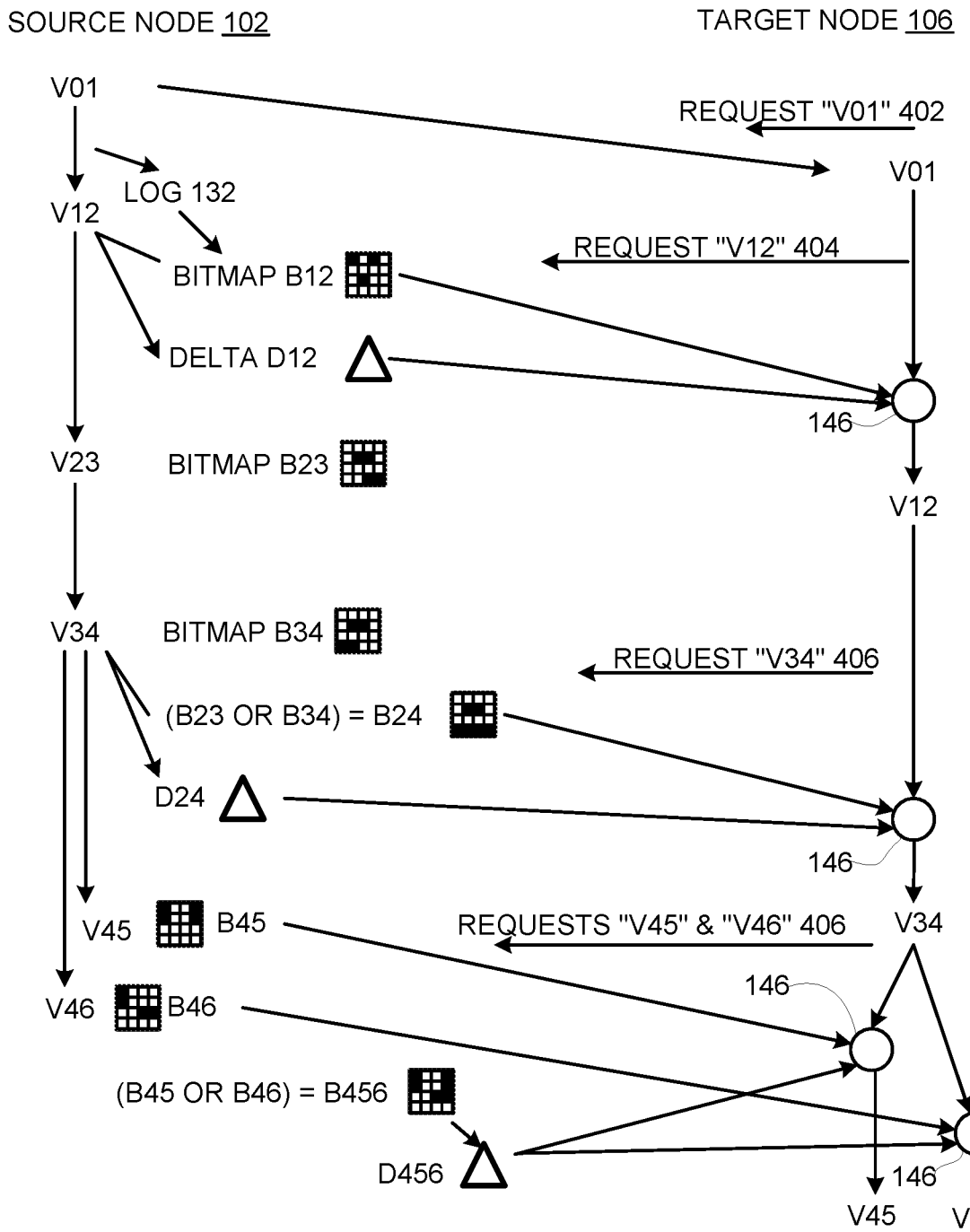
FIG. 4 is a timeline of synchronization events occurring in the computer network of FIG. 1.

FIG. 4 illustrates some of the determinations that can be made by synchronization manager 126. Initially, VMI version V01 of a virtual-machine image or other segmented file is stored on a source node 102. In response to a request 402 for a replica of VMI version V01, a copy of VMI version V01 is transferred over the network to a target node 106. The request may originate at the target node 106 or elsewhere. e.g., at the source node, or at a central management station. No delta file is used since target node 106 does not have an earlier version of the virtual-machine image.

Subsequently, a VMI version V12 of the virtual-machine image is stored on source node 102. There are several scenarios for creating VMI version V12. It can be created by editing version V01, or by editing a replica of version V01 on the source node or on another node. In the latter case, VMI version V12 can have been transferred to the source node. For example, VMI version V01 can be a template that was deployed as an active virtual machine. That virtual machine can have been modified and then cloned to yield VMI version V12.

A log 132 of the modifications can be used to generate a delta bitmap B12 that indicates which segments of the virtual-machine image were changed. In other words, if a difference image of V12-V01 were formed on a segment-by-segment basis, delta bitmap B12 would indicate which segments were changed and which were not. If there is no suitable log available, a bitmap can be generated by comparing version V12 and V01 on a segment-by-segment basis.

In response to a request 404 for VMI version V12 to be sent to the target node, delta bitmap B12 can be applied to VMI version V12 on the source node to generate a delta file D12. Then delta file D12 and delta bitmap B12 can be transferred to the target node. Delta bitmap B12 is then used to identify the segments of the replica of VMI version V01 at the target node that need to be changed, and delta file D12 provides the content for the changed segments.

A VMI version V23 of the virtual-machine image is derived from VMI version V12. The various approaches to generating VMI version V12 apply as well to the generation of VMI version V23. A bitmap B23 indicating which of the segments of VMI version V12 were changed in the process of creating VMI version V23 is generated, either based on a log of modifications of VMI version V12 that led to VMI version V23, or based on a segment-by-segment comparison of VMI versions V12 and V23. In the illustrated embodiment, there is no request for a transfer of VMI version V23, so there is no need to generate the corresponding delta file. However, there is to be a request to synchronize a VMI derived from version V23, so the following illustrates how synchronization is handled when a generation is skipped.

A VMI version V34 is derived from VMI version V23, resulting in a delta bitmap B34. A request 406 for VMI version V34 to be replicated on target node 106 is issued and received. However, since VMI version V23 has not been replicated on target node 106, it will not suffice to use delta bitmap B34 to generate a delta file. Of course, delta bitmap B23 could be used to generate a delta file. Then bitmap B23 and a corresponding delta file can be sent to target node to produce a VMI version V23 replica. The bitmap B34 and a corresponding delta file could be sent to update the VMI version V23 to VMI version V34. In this approach, two bitmaps and two deltas are required to update the VMI version V12 on the target node to VMI version V34. However, there is a more efficient way to synchronize version V34 without having previously synchronizing version V23.

Some savings in bandwidth and storage can be achieved by logically ORing or otherwise logically combining delta bitmaps B23 and B34 to yield bitmap B24. Bitmap B24 can be applied to VMI version V34 to yield a delta file D24. In most scenarios, transferring delta file D24 will consume less bandwidth than transferring deltas for V23 and V34 combined. In the worst case, there is no overlap in the segments changed from VMI version V23 and the segments changed to generate VMI version V34. In that worst case, the bandwidth consumed by transferring delta file B24 would be substantially equal to the total bandwidth consumed by transferring the deltas for VMI version V23 and VMI version V34. In a best case in which the segments changed to generate VMI version V34 are the same as the segments changed to generate VMI version V23, there would be a 50% reduction in bandwidth consumed (assuming no compression is used). Further savings can be achieved by combining three or more bitmaps in scenarios in which more than one version (generation) is skipped.

Combining bitmaps can be useful not only in scenarios that involve generation skipping, but in other scenarios as well. For example, VMI versions V45 and V46 are generated as siblings from parent VMI version V34. Concomitantly, corresponding delta bitmaps B45 and B46 are generated. There is a request for both VMI version V45 and VMI version V46 to be provided to target node 106. Delta bitmaps B45 and B46 are logically ORed to yield a combined bitmap B456. Combined bitmap B456 is used to generate a combined delta file D456. Delta file D456 is sent along with bitmaps B45 and B46 (but not along with bitmap B456) to the target node. The target node applies bitmap B45 to select segments of delta D456 to apply to its copy of VMI version V34 to yield a replica of VMI version V45. The target node applies bitmap B46 to its copy of VMI version V34 to yield a replica of VMI version V46. Thus, only one delta file instead of two need be transmitted; the total size of the transmitted delta file will be less than or equal to the combined sizes of the D45 and D46 delta files that would have been transmitted if the bitmaps were not combined to produce the combined delta file.

In an alternative scenario, the target node has a copy of a delta between VMI versions V34 and V45. In that case, the corresponding bitmap B45 would be sent so that VMI version V45 can be replicated. Bitmap B46 would be sent with the corresponding delta. One delta is sent and, in most cases, it would be smaller than delta D456 that results from the combined bitmap B456. In general, knowing what files are available on the target node can be used to optimize the selection of bitmaps and delta files to be transferred.

The invention not only reduces bandwidth requirements, but also reduces storage requirements. A copy of the requested file and one or more delta bitmaps can suffice for synchronization purposes. The bitmaps tend to be orders of magnitude smaller than the virtual-machine images and the delta files, so their storage requirements can be ignored. Earlier versions of the virtual-machine images can be deleted (unless they are to be requested as well). Any required deltas can be generated upon demand. Of course, once a delta has been generated, it can be desirable to retain it for other transfers; the point is that there is a choice to retain the delta file or to regenerate it upon request. So in contrast to some earlier synchronization approaches, earlier VMI versions and delta files need not be retained to conserve storage space.

On the target node, only the latest version of the VMI need be retained. There is no need to retain earlier versions, there is no need to retain delta files, and there is no need to retain bitmaps. The required delta file(s) and bitmap(s) are transferred in response to a request. Once they have been used to update a version, the older version, the delta, and the bitmap can all be deleted to free up storage space.

Figure 5:
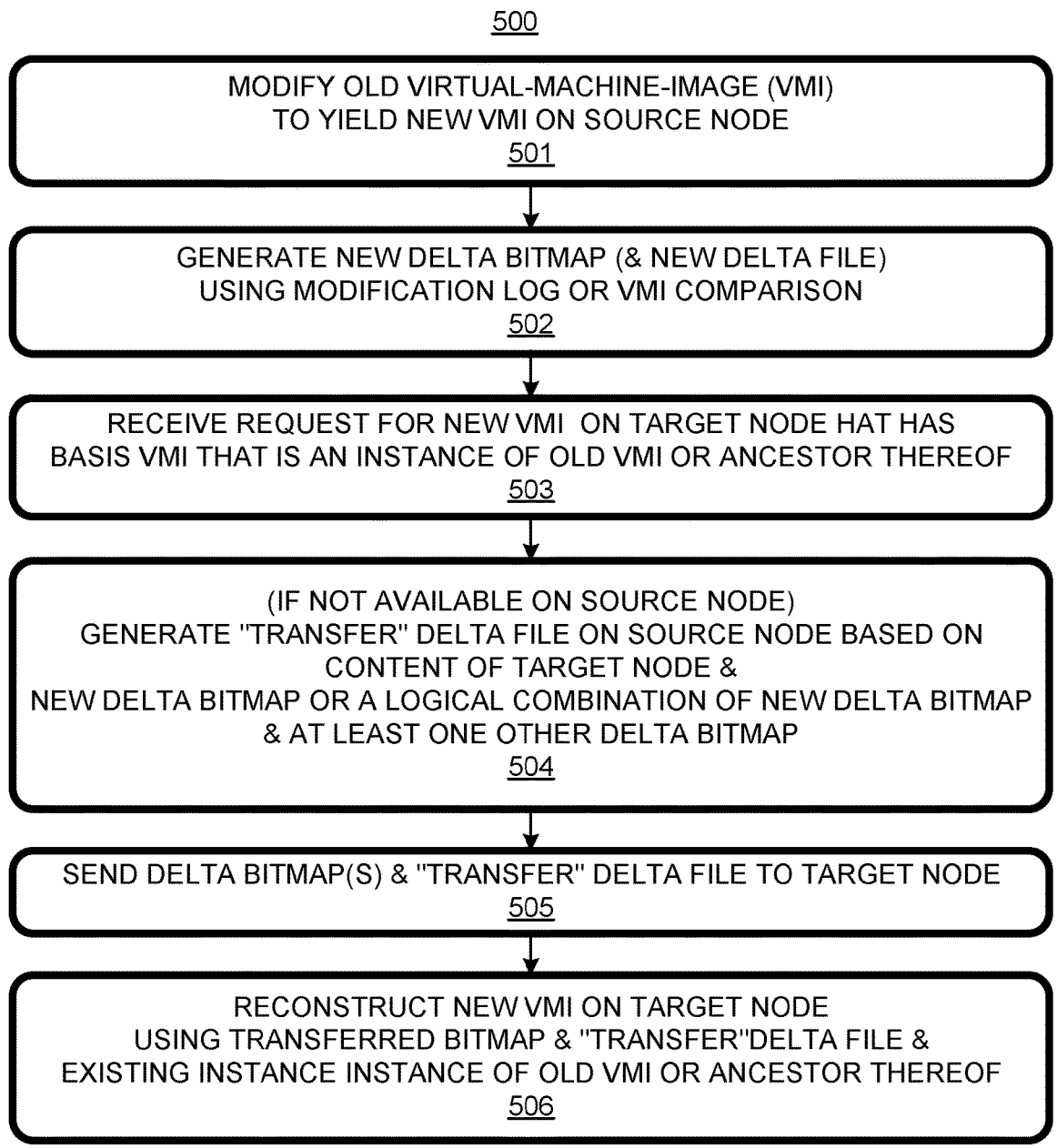
FIG. 5 is a flow chart of a synchronization process that can be implemented in the computer network of FIG. 1 and in other networks.

A process 500, flow charted in FIG. 5, can be practiced in the context of network 100 and other networks. At 501 an "old" virtual-machine image (or other segmented file) is modified to yield a new virtual-machine image (or other segmented file) that is stored on a source node. At 502, a "new" delta bitmap is generated indicating which segments of the old VMI were changed to generate the new VMI. Depending on the variation, the new delta bitmap can be generated using a log of the modifications that led from the old VMI to the new VMI; alternatively, the new delta bitmap can be generated by comparing the new VMI with the old VMI on a segment-by-segment basis. Of course, the latter approach can be used even if the new VMI did not result from a modification of the old VMI.

In some scenarios, a new delta file, representing the segment-by-segment differences between the new and old VMIs, can be generated at this point. For example, if it is known that the instances of the new VMI are to be installed on one or more target nodes known to have instances of the old VMI, the new delta file can be generated at 502 in anticipation of those transfers. However, if it is not known that the new delta file will be needed, then generation of the new delta file can be omitted at this point, pending a request requiring the new delta file.

At 503, a request is issued and received for an instance of the new VMI to be located on a target node, the target node having an instance of the old VMI or an ancestor of the old VMI. Alternatively, the target node may have a VMI that is related is some other known way to the old or new VMI. The request may come from the target node, be generated at the source node, or be sent from a central management station or other source.

At 504, a transfer delta file is generated on the source node or generated elsewhere and transferred to the source node. Typically, the transfer delta file is the same as the new delta file; in that case, if the new delta file is available because it was generated previously at 502, it need not be regenerated at 504. Otherwise, the new delta file can be generated using the new delta bitmap and the new VMI. In some scenarios, the new delta bitmap can be logically ORed or otherwise combined with one or more other delta bitmaps to yield a combined bitmap that can be applied to the new VMI to generate the transfer delta file. The other bitmaps can be associated with ancestors of the old VMI or with siblings of the new VMI or other VMI modifications.

At 505, the transfer delta file and one or more delta bitmaps are transferred to the target node. As indicated above, the transfer delta file may or may not be the same as the (potential) new delta file. The bitmaps may or may not include the new delta bitmap. However, they will include the new delta bitmap or a logical combination of the new delta bitmap and one or more other delta bitmaps. At 506, the new VMI is reconstructed on the target node. The transferred bitmap is used to indicate how the transferred delta file is to be applied to the ancestor file on the target node to realize the new VMI.

In some embodiments and scenarios, it suffices to send the transfer delta file and to forgo sending a separate delta bitmap. The format of the delta files can imply a bitmap such that the delta file can indicate by itself which segments of the old or ancestor VMI are to be replaced.

Herein, "computer", "device", and "machine" refer to hardware. "Virtual" denotes something that appears to be something else that it is not. Thus, a "virtual machine" is software that appears to be a machine to software hosted by the virtual machine. A "virtual-machine image" is a physical encoding of a virtual machine, including its hosted software, in non-transitory media. The virtual-machine images of interest herein are formatted as disk images into segments; the segments can be, for example, clusters or groups of clusters. A "cluster" is the smallest amount of data that can be retrieved at once from a respective storage media. Files within a virtual-machine image tend to be aligned with segment boundaries. This fact makes it practical to compare virtual-machine images on a segment-by-segment basis. Herein, two objects are "the same" if they are the same instance of an object or equivalent but distinct instances of an object.

Familial terms such as "parent", "child", "sibling", and "ancestor" refer to relations by derivation. For example, if file A is derived from file B, then file B is the parent of file B. If, then, file C is derived from file A, then file B is an ancestor, namely, the grandparent, of file C, and so on.

Herein, all art labeled "prior art", if any, is admitted prior art. Art not labelled "prior art", if any, is not admitted prior art. The illustrated embodiments, as well as variations thereupon and modifications thereto are provided for by the present invention, the scope of which is defined by the following claims.

What is claimed is:

1. A process performed at a source node, comprising:
   creating and modifying a virtual machine using an editor at said source node to modify a first version of a virtual machine image to yield a second version of said virtual machine image and a third version of said virtual machine image, wherein said editor creates and updates a log of modifications to said virtual machine sufficient to determine how said first version of said virtual machine image has been modified;
   obtaining a plural delta bitmaps for respective pairs of segmented files of virtual machine images stored on the source node, wherein the virtual machine images include said first version of said virtual machine image, said second version of said virtual machine image and said third version of said virtual machine image, each delta bitmap of said plural delta bitmaps indicating at which segment positions, differences can be found between said respective pairs of said first version of said virtual machine image and said second version of said virtual machine image, and between said second version of said virtual machine image and said third version of said virtual machine image, said plural delta bitmaps generated utilizing said log of modifications;
   receiving a request to provide to a target node a copy of said third version of said virtual machine image corresponding to said first version of said virtual machine image already stored at said target node, the target node being different from the source node, the first version of said virtual machine image not being the same as said third version of said virtual machine image;
   logically combining two or more of the plural delta bitmaps from said respective pairs of said first version of said virtual machine image and said second version of said virtual machine image, and between said second version of said virtual machine image and said third version of said virtual machine image to yield a transfer bitmap, wherein said transfer bitmap indicates at which segment positions, differences exist between said first version of said virtual machine image and said third version of said virtual machine image;
   generating a transfer delta file including segments of the second version of said virtual machine image and said third version of said virtual machine image, the segments being selected based on the transfer bitmap;
   transferring the transfer delta file and the transfer bitmap to the target node;
   constructing a copy of the third version of said virtual machine image on the target node by replacing segments of the first version of said virtual machine image with the segments of the transfer delta file; and
   creating and modifying a virtual machine corresponding to said plural delta bitmaps using an editor at said target node to modify said first version of said virtual machine image already stored in the target node to yield said third version of said virtual machine image.

2. A system comprising non-transitory media encoded with code that, when executed by a processor, implements a process at a source node including:
   creating and modifying a virtual machine using an editor at said source node to modify a first version of a virtual machine image to yield a second version of said virtual machine image and a third version of said virtual machine image, wherein said editor creates and updates a log of modifications to said virtual machine sufficient to determine how said first version of said virtual machine image has been modified;
   obtaining a plural delta bitmaps for respective pairs of segmented files of virtual machine images stored on the source node, wherein the virtual machine images include said first version of said virtual machine image, said second version of said virtual machine image and said third version of said virtual machine image, each delta bitmap of said plural delta bitmaps indicating at which segment positions, differences can be found between said respective pairs of said first version of said virtual machine image and said second version of said virtual machine image, and between said second version of said virtual machine image and said third version of said virtual machine image, said plural delta bitmaps generated utilizing a said log of modifications;
   receiving a request to provide to a target node a copy of said third version of said virtual machine image corresponding to said first version of said virtual machine image already stored at said target node, the target node being different from the source node, the first version of said virtual machine image not being the same as a said third version of said virtual machine image;
   logically combining two or more of the plural delta bitmaps from said respective pairs of said first version of said virtual machine image and said second version of said virtual machine image, and between said second version of said virtual machine image and said third version of said virtual machine image to yield a transfer bitmap, wherein said transfer bitmap indicates at which segment positions, differences exist between said first version of said virtual machine image and said third version of said virtual machine image;

generating a transfer delta file including segments of the second version of said virtual machine image and said third version of said virtual machine image, the segments being selected based on the transfer bitmap;

transferring the transfer delta file and the transfer bitmap to the target node;

constructing a copy of the third version of said virtual machine image on the target node by replacing segments of the first version of said virtual machine image with the segments of the transfer delta file; and creating and modifying a virtual machine corresponding to said plural delta bitmaps using an editor at said target node to modify a said first version of said virtual machine image already stored in the target node to yield said third version of said virtual machine image.

3. The system of claim 2 further comprising the processor.

* * * * *